Oct. 6, 1964    K. W. TANTLINGER ETAL    3,151,904
CONTAINER HANDLING APPARATUS
Filed May 24, 1961    8 Sheets-Sheet 5
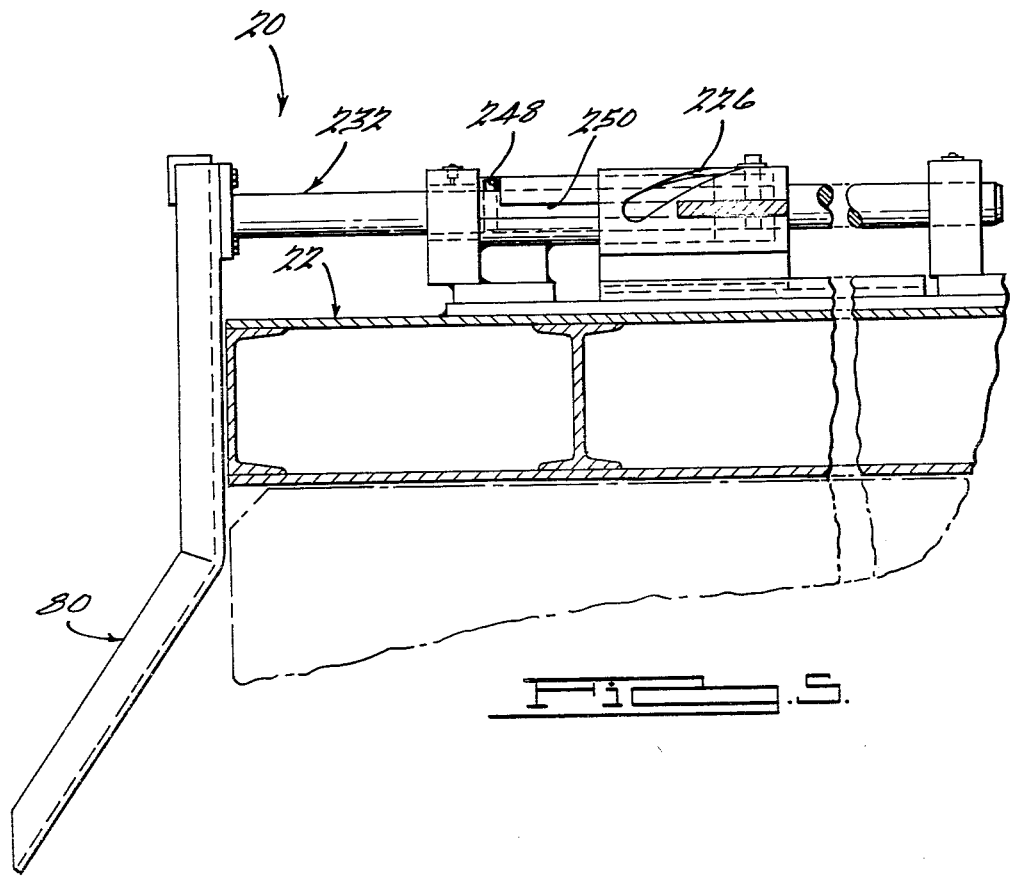
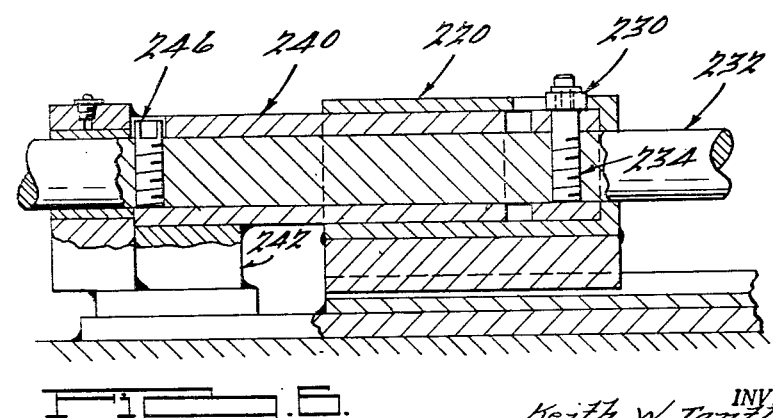
INVENTORS.
Keith W. Tantlinger.
Robert G. Flagan,
BY Richard F. Fujioka
Harness, Dickey & Pierce.
ATTORNEYS

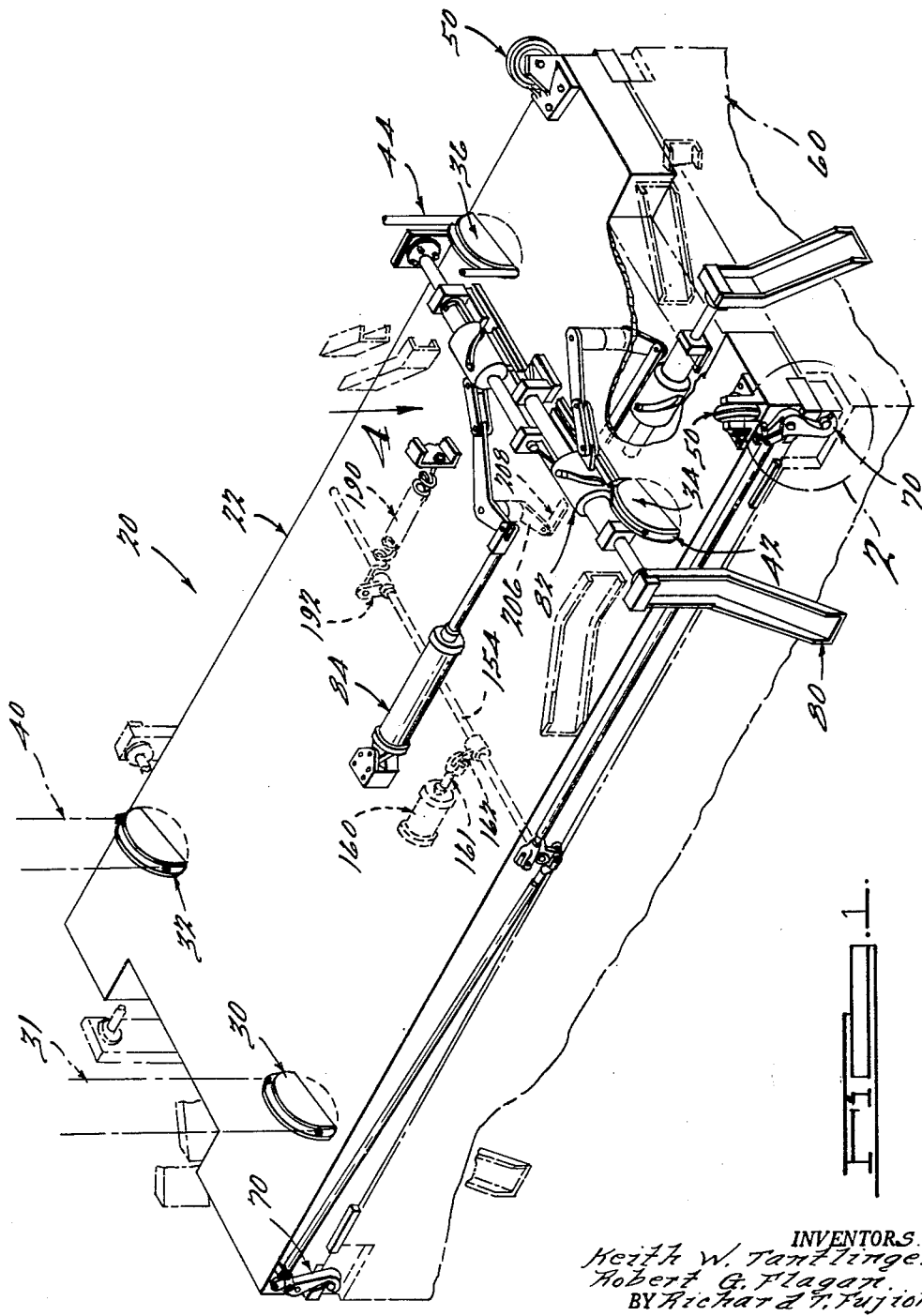

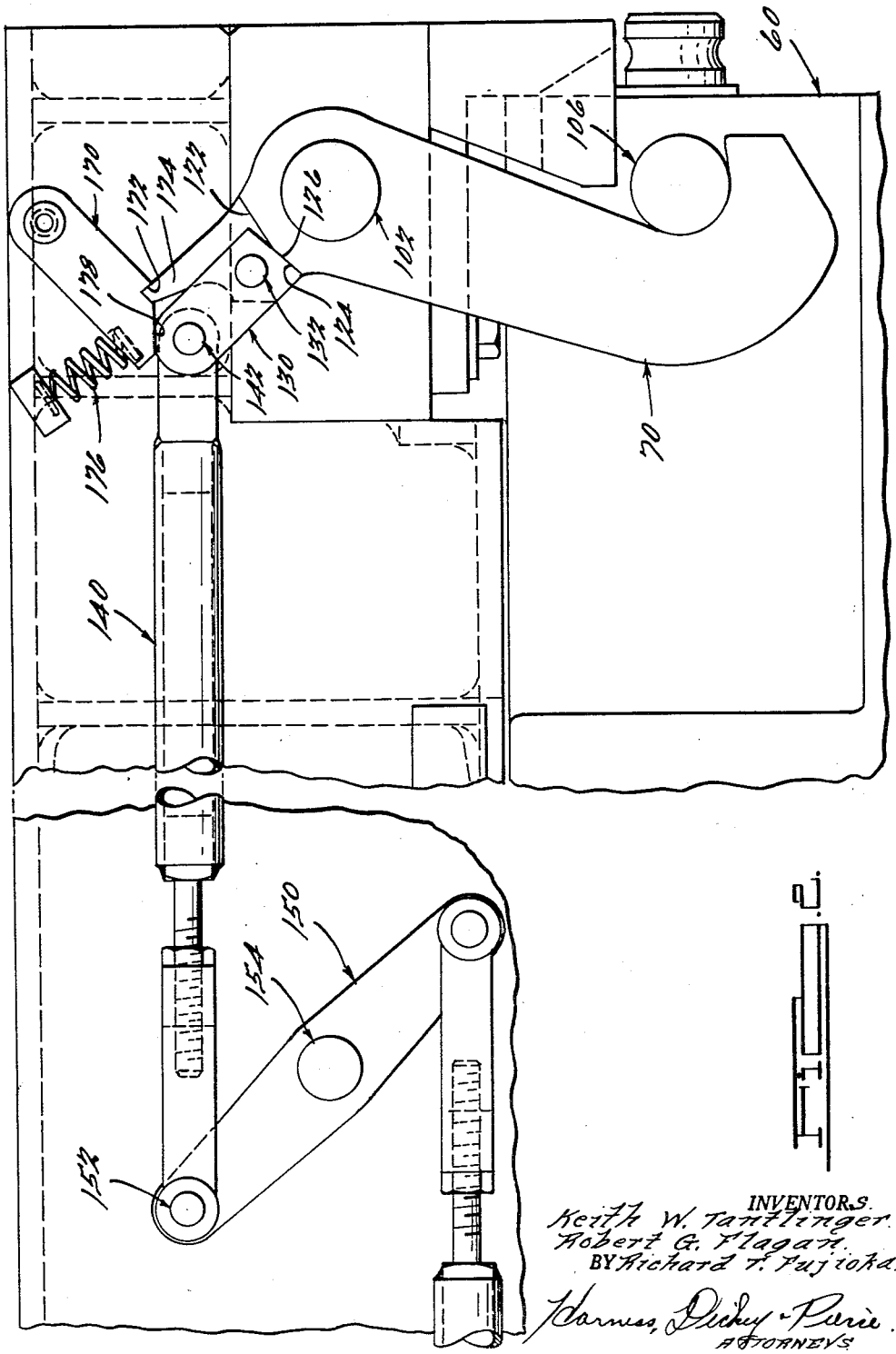

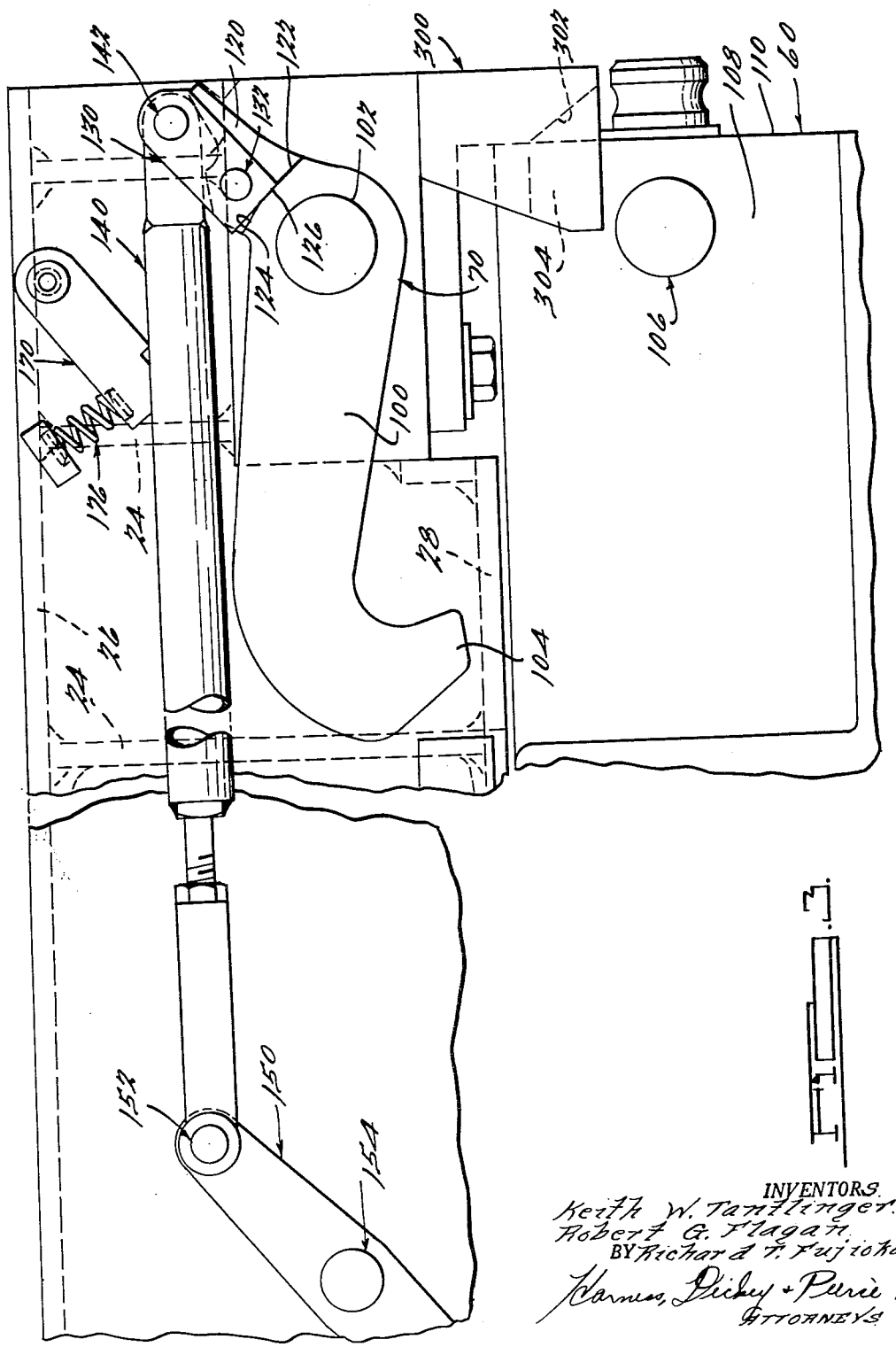

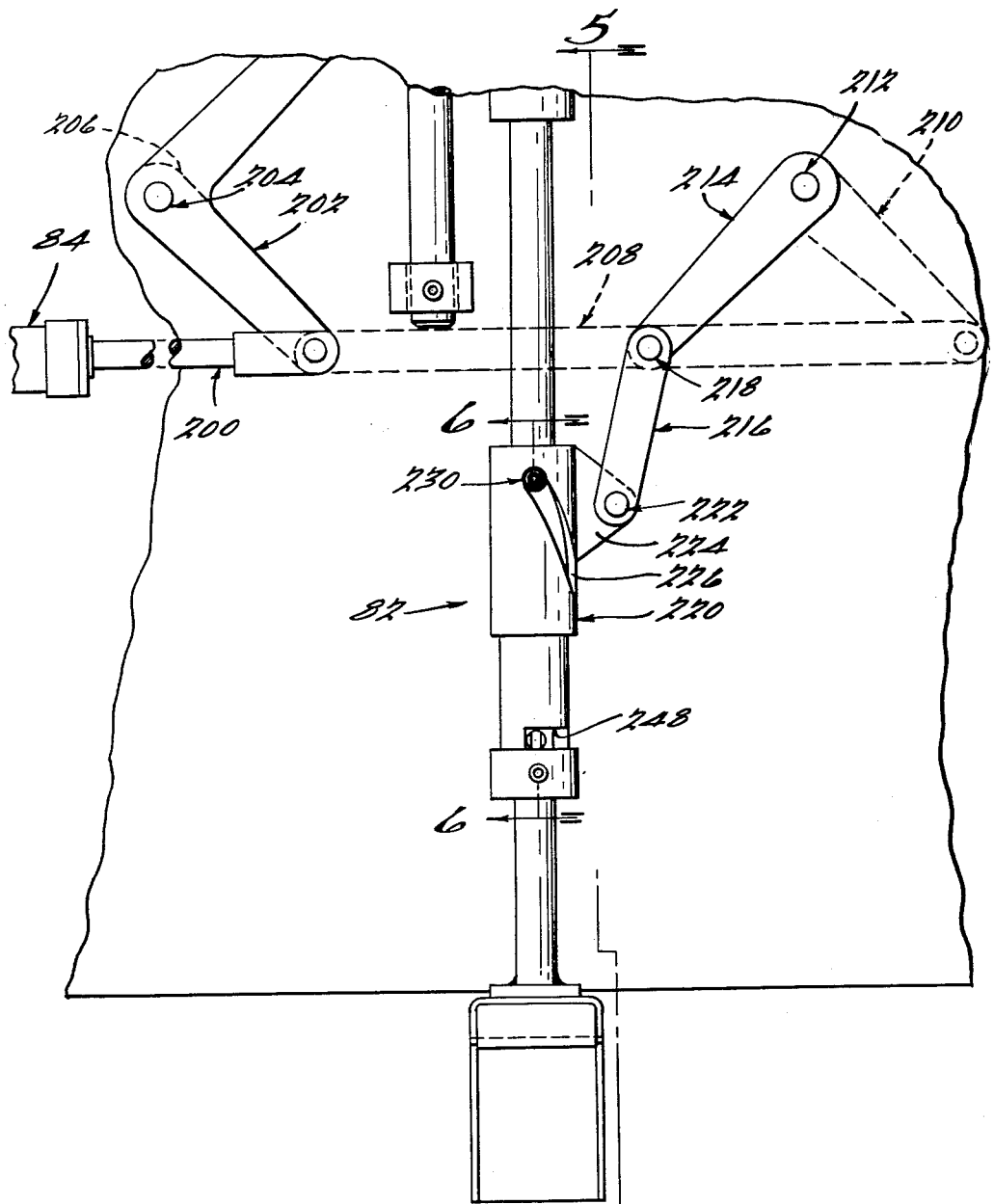

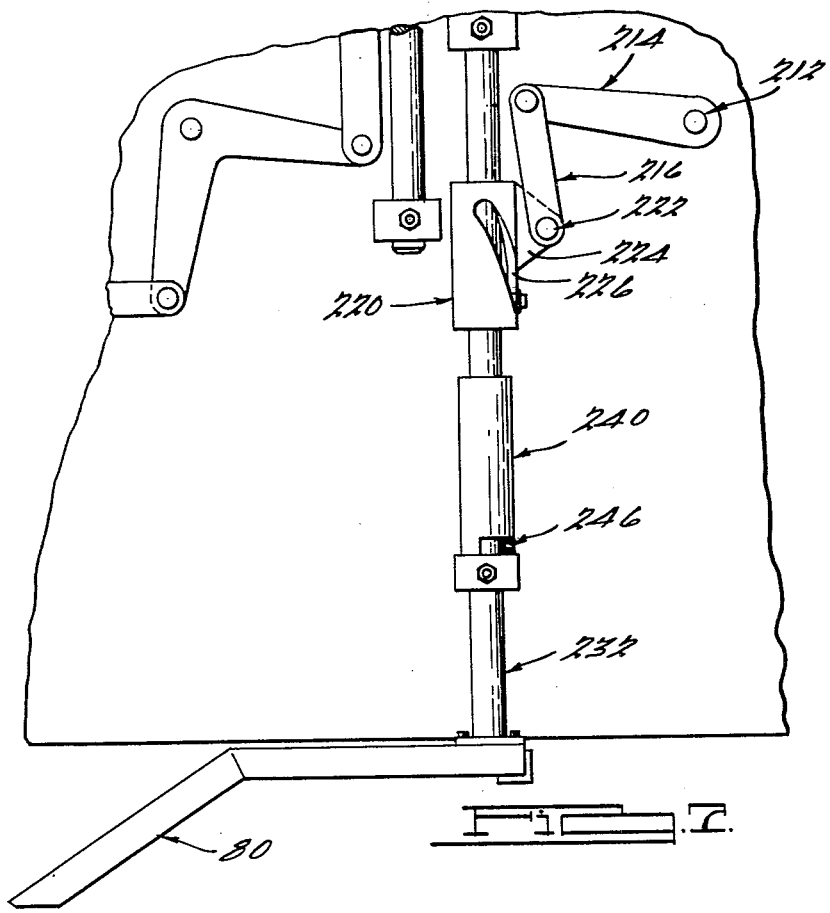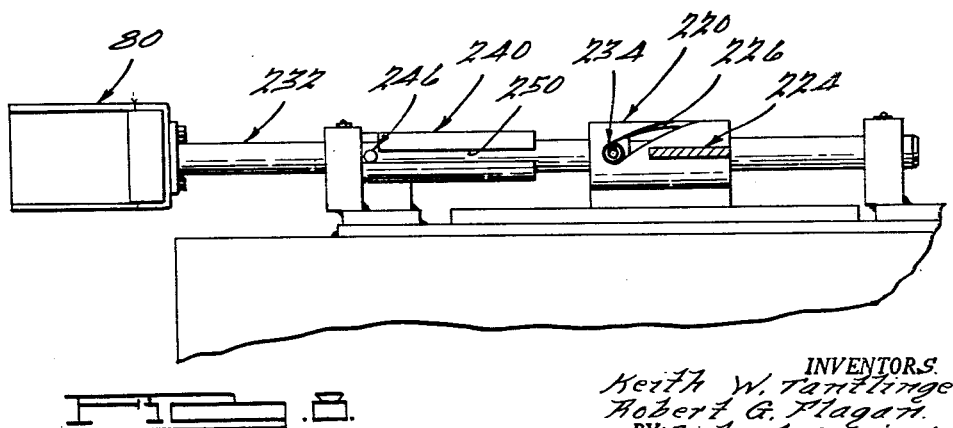

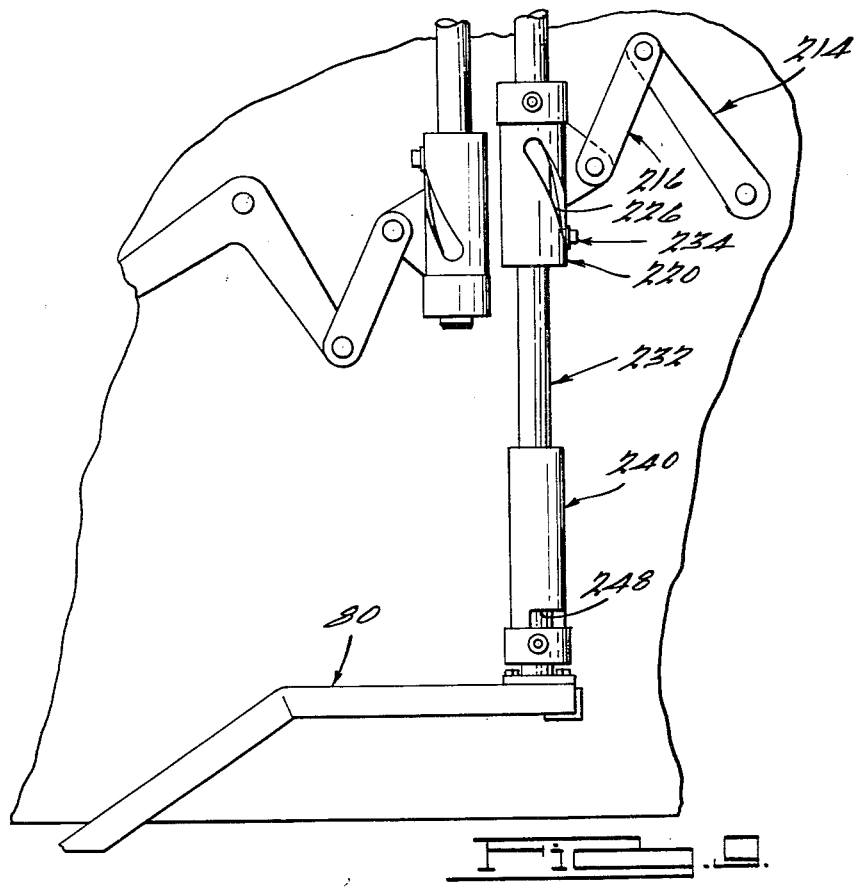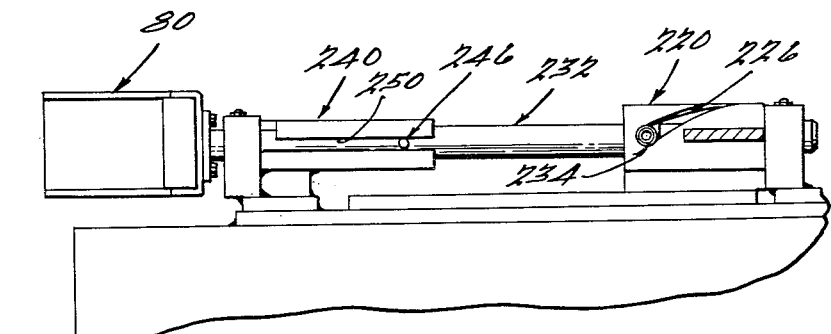

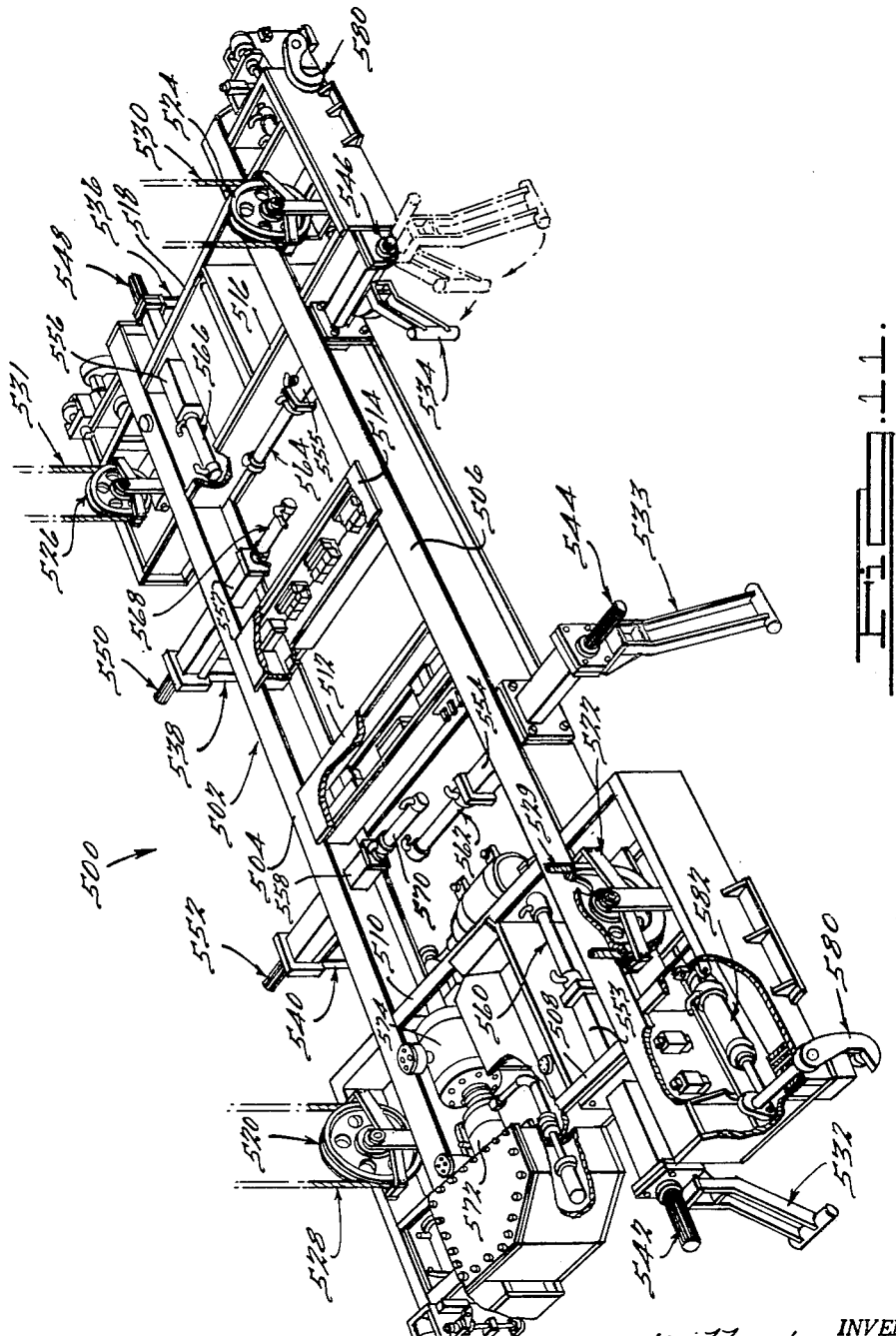

3,151,904
CONTAINER HANDLING APPARATUS

Keith W. Tantlinger, Grosse Pointe Shores, Robert G. Flagan, Grosse Pointe Park, and Richard T. Fujioka, Oxford, Mich., assignors to Fruehauf Corporation, a corporation of Michigan
Filed May 24, 1961, Ser. No. 112,418
2 Claims. (Cl. 294—67)

This invention relates generally to freight handling apparatus and more particularly to a novel spreader bar for handling shipping containers or the like.

The transfer of shipping contaners, truck bodies or the like between, for example, a ship and a dock facility, is often accomplished by coupling a container to a spreader bar that depends from an overhead crane. However, coupling of such spreader bars to a container is often rendered difficult due to, for example, wind conditions, rolling of the ship at the dock, or other environmental factors.

This problem is solved, in accordance with the present invention, by a novel spreader bar having a plurality of downwardly extending arms that are engageable with the container to guide the spreader bar into position above the container so that the coupling apparatus thereof is properly aligned with complementary coupling means on a container.

After the spreader bar is coupled to the containers, the arms are retractable from the downwardly depending condition to provide the necessary clearance for lowering the container into, for example, the hold of a ship.

The provision of such retractable aligning arms is complicated by the requirement that such spreader bars be of minimum vertical dimension so as to be elevatable into close proximate relation to the underside of the crane trolley. This requirement is brought about by the desire to minimize the height of the crane above, for example, a dock or shipping facility, or, on deck-mounted cranes, above the height of the deck of the ship. Therefore, the movement of the aligning arms between the retracted and aligning conditions must be such that the path of movement does not preclude elevation of the spreader bar into close proximate relation with the underbody of the crane trolley.

The foregoing requirement that the spreader bar be elevatable into close proximate relation with the underside of a crane trolley is critical when the crane is mounted aboard a ship and two or more containers are stacked on the deck thereof. Under these conditions, a spreader bar having an excessively large vertical dimension limits the ability of the crane to move into alignment over the uppermost container.

Accordingly, the spreader bar of the instant invention is of minimum vertical dimension so that the required clearance between the underside of a crane trolley and the top of the uppermost container is minimized. This relatively small vertical clearance requirement is satisfied by retracting the alignment arms on the spreader bar to a condition wherein they extend substantially parallel to and within the plane of the spreader bar. In this manner, the length of the aligning arms does not influence the vertical clearance requirement of the spreader bar and the arms are operable with the spreader bar two-blocked against the trolley.

Thus, by effecting retraction and extension of the aligning arms by a novel rotative and translatory movement that minimizes the vertical clearance required for the arms, the spreader bar can be drawn upwardly into close proximate relation to the underside of the overhead crane trolley.

Another feature of the present invention is to provision for fine alignment of the spreader bar with respect to a container after the spreader bar is guided into closely spaced relation thereto by the aligning arms.

Yet another feature of the spreader bar of the present invention is a positive coupling means having a self-energizing safety.

Accordingly, one object of the invention is an improved freight handling apparatus.

Another object is an improved spreader bar for handling containers or the like.

Another object is a spreader bar that is elevatable into close proximate relation to the underside of a supporting crane.

Another object is a spreader bar having downwardly depending guide arms for guiding the spreader bar towards engagement with a shipping container.

Another object is a spreader bar having guide arms that are foldable to a storage condition occupying a minimum of space.

Another object is a spreader bar having alignment arms that are movable between an aligning and storage condition with a minimum of vertical clearance requirement.

Another object is a spreader bar having coarse and fine alignment means.

Another object is a spreader bar having an improved container engaging mechanism.

Another object is a spreader bar having a container engaging mechanism with a positive safety thereon.

Other objects and advantages of the present invention will be apparent in the following detailed description, claims and drawings, wherein;

FIGURE 1 is a perspective view of a spreader bar in accordance with an exemplary embodiment of the present invention;

FIG. 2 is a fragmentary view of the structure within the circle 2 of FIGURE 1;

FIG. 3 is a view similar to FIG. 2 with the container engaging finger rotated to the storage condition;

FIG. 4 is a top view of the spreader bar of FIGURE 1;

FIG. 5 is a cross-sectional view taken substantially along the line 5—5 of FIG. 4;

FIG. 6 is a cross-sectional view taken substantially along the line 6—6 of FIG. 4;

FIG. 7 is a top view similar to FIG. 5 showing the aligning arm and mechanism rotated to an intermediate position;

FIG. 8 is a view similar to FIG. 5 showing the aligning arm and mechanism rotated to the intermediate position of FIG. 7;

FIG. 9 is a top view of the aligning arm and mechanism similar to FIG. 4 showing the aligning arm and mechanism in the retracted position;

FIG. 10 is a cross-sectional view similar to FIG. 5 showing the aligning arm and mechanism in the retracted position; and FIG. 11 is a perspective view of another form of the spreader bar.

Referring now to FIGURE 1 of the drawing, a spreader bar 20 in accordance with an exemplary embodiment of the present invention comprises a generally rectangular frame 22 that may be made up from, for example, a number of transverse plates 24 (FIG. 3) that are substantially enclosed by top and bottom plates 26 and 28, respectively, thereby to form a substantially rigid structure.

The spreader bar 20 is provided with a plurality of conventional sheaves 30, 32, 34 and 36 for the acceptance of hoisting cables 38, 40, 42 and 44, respectively that extend downwardly from an overhead crane (not shown).

The spreader bar 20 is provided with alignment rollers 50 at the corners thereof for guiding the spreader bar downwardly in the vertically extending ways of the cargo hold of a ship. It is to be understood that the rollers 50 are usable to guide the spreader bar 20 and a load coupled thereto for movement within the hold of a ship and, in addition, to guide the spreader bar 20 alone into position above a container when such a container is located within the cargo hold of a ship.

At such times as, for example, a load-supporting container 60 of the type more particularly described in application Serial No. 112,635 filed May 25, 1961, and assigned to the assignee of the present invention, is located exteriorly of a cargo hold of a ship on, for example, a loading dock, difficulty is often incurred in positioning the spreader bar 20 directly over the container 60 to facilitate engagement of a plurality of pickup hooks 70, one of which is located at each corner of the spreader bar 20 with the container 60. The hooks 70 are rotatable about a horizontal axis to engage suitable coupling pins on the container 60 thereby to rigidly couple the spreader bar and container 60.

To effect alignment of the spreader bar 20 with respect to the container 60, a novel aligning mechanism is mounted on the spreader bar 20 and comprises a plurality of rotatable and retractable arms 80 that are mechanically rotated and retracted by an operating mechanism 82 therefor. The operating mechanism 82 is driven through a suitable mechanical linkage, to be described, as by a hydraulic cylinder 84.

Turning now to FIG. 3 of the drawings, each lifting hook 70 comprises an arm portion 100, pivoted on a shaft 102 for rotation about a horizontal axis extending transversely of the spreader bar 20. The hook 70 has a re-entrantly directed end portion 104 for engagement with a laterally extending pin 106 on the upper corner portion of the container 60. It is to be noted that the pin 106 extends transversely outwardly from a recessed face portion 108 in a corner member 110 of the container 60. The corner member 110 and pin 106 are more particularly described in the aforementioned application, Serial No. 112,635. The hook 70 has an upper end portion 120 with a pair of annularly related shoulders 122 and 124 thereon for engagement with an end face 126 of a drive link 130. The drive link 130 is pivotally coupled to the end portion 120 of the hook 70 by a pin 132 and pivotally connected to an actuator rod 140 as by a pin 142. The drive link 130 effects rotation of the lift hook 70 as well as locking thereof, as will be described. The actuator rod 140 is coupled to a yoke 150 by a pin 152, the yoke 150 being drivable by a shaft 154 that extends transversely of the frame 22 of the spreader bar 20. The shaft 154 is driven as by a hydraulic cylinder 160 through a suitable drive arm 162. Actuation of the cylinder 160 effects rotation of the shaft 154 and yoke 150, reciprocation of the rod 140, and, as will be more particularly described, rotation of the hook 70 about the shaft 102 to the engaged and disengaged position with respect to the pin 106.

As best seen in FIG. 2 of the drawings, the hook 70 is lockable in the downward or engaged position with the pin 106 on the container 60 by a locking key 170. The key 170 has a generally rectangular shoulder 172 that is engageable with a complementary upper end portion 174 on the end portion 120 of the hook 70 to preclude clockwise rotation of the hook 70. The locking key 170 is normally biased counterclockwise into the locking position by a spring 176. The locking key 170 also has a cam face 178 that is engageable with the actuator rod 140 to hold the key 170 in the disengaged or unlocked condition when the hook 70 is disengaged from the pin 106 of the container 60 (FIG. 3).

Disengagement of the hook 70 from the pin 106 is effected upon energization of the hydraulic cylinder 160 so as to move the actuator rod 140 to the right as seen in FIG. 2, the drive link 130 being rotatable about the pin 132 thereby rocking the lower end face 126 thereof out of engagement with the shoulder 124 on the hook 70, into engagement with the shoulder 122 thereof. Because the hook 70 is restrained from counterclockwise movement by engagement of the hook portion 104 thereof with the pin 106, movement of the actuator rod 140 to the right effects rotation of the pin 142 with respect to the pin 132 which rotation effects elevation of the end portion of the actuator rod 140. Elevation of the end portion of the actuator rod 140 disengages the shoulder 172 of the locking key 170 from engagement of the end portion 174 of the hook 70, which movement is against the normal bias of the spring 176. Disengagement of the locking key 170 occurs just prior to engagement of the end face 126 on the link 130 with the shoulder 122 on the hook 70. Therefore, upon engagement with the face 126 with the shoulder 122, further movement of the actuator rod 140, to the right as seen in FIGS. 2 and 3, effects a clockwise rotation of the hook 70, disengaging the hook-end portion 104 thereof from the pin 106. The hook 70 is normally held in the disengaged condition as by a spring 190 that acts on the shaft 154 through an arm 192.

Engagement of the hook 70 with the pin 106 is substantially the reverse of the aforementioned operation, the actuator rod 140 being moved to the left, as seen in FIG. 3, under the influence of the hydraulic cylinder 160 which is coupled to the shaft 154 through the arm 162. The first increment of movement of the actuator rod 140 to the left, as seen in the drawings, effects reengagement of the end face 126 of the drive link 130 with the shoulder 124 on the hook 70, further movement of the actuator shaft 140 transmitting a counterclockwise torque to the hook 70 through the drive link 130. At such time as the hook 70 engages the pin 106, the end portion 174 of the hook 70 is rotated sufficiently far in the counterclockwise direction to permit the shoulder 172 of the locking key 170 to move into engagement therewith under the bias of the spring 176 thereby locking the hook 70 in the engaged position about the pin 106.

The aforementioned operation results in automatic locking and unlocking of the lifting hook 70 with respect to the container 60.

To solve the aforementioned problem with respect to movement of the spreader bar 20 with respect to a rigidly supported shipping container 60 due to, for example, rocking of a ship or high wind velocities, the spreader bar 20 is provided with a plurality of rotatable and retractable downwardly depending arms 80. As best seen in FIGURE 1, each of the arms 80 is provided with an operating mechanism 82 that effects rotation thereof to the downwardly extending or vertical condition upon rotation from the vertical condition to a horizontal condition with subsequent retraction of the arms in a horizontal plane so that the arms do not extend horizontally outwardly of the cross-section of the spreader bar. This retraction of the arms is necessary so as to condition the spreader bar 20 for vertical movement within a loading chute in, for example, a ship. As discussed hereinbefore, rotation of the alignment arms 80 between an aligning condition and a storage condition is unsatisfactory in that a prohibitive amount of clearance space would be required above the spreader bar 20 for rotation of the arms to the stored condition, thereby precluding elevation of the spreader bar into close proximate relation to the underside of a lifting crane.

As best seen in FIG. 4, the arm actuating hydraulic actuator 84 is connected to the arm actuating mechanism 82 by a reciprocable shaft or rod 200. The actuator rod 200 is connected to a yoke 202 that is pivotally supported as by a pin 204 for rotation about a vertical axis. As best seen in FIGURE 1, a crank arm 206 is connected to an opposite end of the shaft 204 and effects reciprocation of the drive link 208 upon oscillation of the yoke 202 due to energization of the hydraulic actuator 84. Preferably, the crank 206 and drive link 208 are housed internally of the frame 22 of the spreader bar 20. The drive link 208 is connected as by a link 210 and pin 212, to a link 214. The link 214 is connected to a link 216 as by a pin 218, the link 216 being connected to a drive sleeve 220 as by a pin 222. The pin 222 is mounted in a radially extending bracket 224 on the drive sleeve 220.

The drive sleeve 220 has a helical slot 226 therein for the acceptance of a radially extending cam 230. As best seen in FIG. 6, the cam 230 is rigidly affixed to a shaft 232 as by a stud 234. Therefore, because the sleeve 220 is restrained from rotation by the aforementioned linkage, axial movement of the sleeve 220 with respect to the shaft 232 effects rotation of the shaft 232 due to movement of the cam 230 within the helical groove 226.

The sleeve 220 is slidably and telescopically mounted on an intermediate sleeve 240 that is journaled about the shaft 232. Because the sleeve 240 is rigidly affixed to a supporting bracket 242 as by welding, rotation of the shaft 232 due to movement of the sleeve 220 does not effect rotation of the sleeve 240. Thus, relative rotation between the shaft 232 and intermediate sleeve 240 effects movement of a cam post 246 on the shaft 232, first radially in a slot 248 in the intermediate sleeve 240, then axially in a slot 250 in the intermediate sleeve 240. Accordingly, initial axial movement of the drive sleeve 220 with respect to the shaft 232 effects rotation only of the shaft 232 due to movement of the cam 230 within the groove 226. As best seen by comparing FIGS. 4 and 5, initial movement of the drive sleeve 220 effects a 90 degree rotation of the cams 230 and 246 at which position the cam 246 is axially aligned with the slot 250 in the intermediate sleeve 240. Alignment of the cam 246 with the slot 250 conditions the shaft 232 for axial movement with respect to the intermediate sleeve 240 under the bias of the drive sleeve 220 due to further energization of the actuator 84. This movement is illustrated in FIGS. 9 and 10 wherein the drive sleeve 220 has moved to the end position with respect to the shaft 232 pulling the shaft 232 therewith during the last increment of movement due to engagement of the cam 230 with the end of the helical slot 226 in the drive sleeve 220. This axial movement of the shaft 232 effects a retraction of the arm 80.

Thus, it is seen that the arm 80 is movable from a downwardly depending position to a retracted condition without requiring any substantial clearance above the spreader bar 20. This movement is effected by first rotating the arm 80 ninety degrees to the horizontal position and then retracting the arm 80 so that the terminal portion thereof is substantially within the horizontal cross section of the spreader bar 20.

Fine alignment of the spreader bar 20 with respect to the container 60 is effected by four corner members 300, each of which has a pair of angularly downwardly extending cam surfaces 302 and 304 that slidably engage the corner members of the containers upon engagement therewith and accommodate any relatively small misalignment between the spreader bar 20 and container 60. Thus, the spreader bar 20 is guided into what may be termed a coarse alignment with the container 60 by the arms 80 and into fine alignment therewith by the corner blocks 300.

Referring now to FIG. 11, a modified spreader bar 500 of yet smaller vertical dimensions, comprises a frame 502 having a pair of longitudinal members 504 and 506 spaced apart by a plurality of generally parallel transverse members 508, 510, 512, 514, 516 and 518.

A plurality of sheaves 520, 522, 524 and 526 are rotatably supported on the spreader bar 500 for the acceptance of complementary cables 528, 529, 530 and 531, respectively, that depend downwardly from the trolley of, for example, a ship or deck-mounted crane (not shown).

The spreader bar 500 is provided with a plurality of aligning arms 532, 533, 534, 536, 538 and 540 that are actuated by rotatable and reciprocable drive shafts 542, 544, 546, 548, 550 and 552, respectively, which are similar to the drive shaft 232 hereinbefore disclosed.

The drive shafts 542, 544, 546, 548, 550 and 552 are driven by sleeve assemblies 553, 554, 555, 556, 557 and 558, similar to the assembly associated with the drive shaft 232 discussed hereinbefore, the principal difference being that the drive shafts on the spreader bar 500 are individually driven by a plurality of hydraulic actuators 560, 562, 564, 566, 568 and 570, respectively, which are energized from a conventional pump 572 and motor 574.

Movement of the respective aligning arms is best seen by noting the phantom position of the arm 534, the solid line position thereof showing the retracted condition to facilitate lowering of the spreader bar 500 for movement into, for example, the hold of a ship. It is to be understood that the aligning arms first rotate to a condition wherein they lie between spaced planes defined by the upper and lower surfaces of the longitudinal members 504 and 506 and are then retracted in translation so that the terminal end portions thereof lie within a rectangle defined by the outer extremity of the spreader bar 500.

The spreader bar 500 has a plurality of load-engaging hooks 580 at each corner thereof (two of which are shown), the hooks 580 being engageable with complementary apparatus on the load as discussed hereinbefore. It is also to be noted that the hooks 580 are separately driven to the engaged and disengaged conditions as by individual hydraulic actuators 582 (one of which is shown) in association with the hook 580. The principal difference between the spreader bar 20 and the spreader bar 500 is that the spreader bar 500 is of relatively smaller vertical dimension that the spreader bar 20, due to mounting of all of the operating components thereof between the upper and lower planes defined by the structural members thereof, and that the movable components of the spreader bar 500 are individually driven by separate hydraulic actuators.

It will be appreciated that the arms 80 are not necessarily coupled for concurrent operation, but may be individually operable or operable in any desired combination to accommodate specific conditions.

It is to be understood that the specific constructions of the improved container handling apparatus herein disclosed and described are presented for the purpose of explanation and illustration and are not intended to indicate limits of the invention, the scope of which is defined by the following claims.

What is claimed is:

1. A spreader bar for handling a container of generally rectangular horizontal cross section, said spreader bar comprising a generally planar frame of horizontal rectangular cross section complementary to the container, means supported by said frame for releasably engaging the container, and means depending downwardly from said frame for vertically aligning said spreader bar with respect to the container, said aligning means being rotatable from the aligning condition to a condition generally parallel to the frame and retractable in translation from the parallel condition to a condition substantially within the rectangular cross section of said spreader bar.

2. A spreader bar for handling a generally rectangular shipping container, said spreader bar comprising a generally planar frame having a rectangular cross section complementary to the shipping container, said frame being of relatively small dimension, means supported on said frame for releasably engaging the shipping container, a plurality of aligning arms on said frame extendable downwardly substantially below the lowermost point thereof for vertically aligning said spreader bar with respect to the container, means for rotating said arms from the downwardly depending aligning condition to a condition horizontally aligned with said frame, and means for retracting said aligning arms in translation to a position substantially within the rectangular cross section of said spreader bar.

References Cited in the file of this patent

UNITED STATES PATENTS

| | | |
|---|---|---|
| 1,270,995 | Weickel | July 2, 1918 |
| 1,717,006 | Cartwright | June 11, 1929 |
| 1,733,084 | Schmidt et al. | Oct. 22, 1929 |
| 2,047,141 | Fildes | July 7, 1936 |
| 2,212,064 | Elliot | Aug. 20, 1940 |
| 2,847,245 | Leslie | Aug. 12, 1958 |
| 3,078,115 | Harlander et al. | Feb. 19, 1963 |

FOREIGN PATENTS

| | | |
|---|---|---|
| 1,178,214 | France | Dec. 8, 1958 |